United States Patent [19]

Shibata et al.

[11] Patent Number: 5,171,575
[45] Date of Patent: Dec. 15, 1992

[54] PROCESS FOR PREVENTING DIARRHEA IN ANIMALS

[75] Inventors: Kenji Shibata, Kawagoe; Masami Ozima, Kawashima; Takeaki Hasegawa, Kawagoe, all of Japan

[73] Assignee: Nisshin Flour Milling Co., Ltd., Tokyo, Japan

[21] Appl. No.: 728,032

[22] Filed: Jul. 2, 1991

Related U.S. Application Data

[63] Continuation of Ser. No. 539,629, Jun. 18, 1990, abandoned, which is a continuation-in-part of Ser. No. 463,003, Jan. 8, 1990, abandoned, which is a continuation of Ser. No. 142,914, Jan. 12, 1988, abandoned.

[30] Foreign Application Priority Data

Jan. 19, 1987 [JP] Japan ................................... 62-8186
Dec. 15, 1987 [JP] Japan ................................. 62-315092

[51] Int. Cl.⁵ ............................................. A23K 1/165
[52] U.S. Cl. ................................... 424/442; 424/439; 424/440; 514/867
[58] Field of Search ..................... 424/440, 442, 439; 514/867

[56] References Cited

U.S. PATENT DOCUMENTS

| | | | |
|---|---|---|---|
| 3,928,574 | 12/1975 | Phillips | 514/867 |
| 4,282,274 | 8/1981 | Mookherjee | 427/402 |
| 4,332,814 | 6/1982 | Newsome | 514/867 |
| 4,362,710 | 12/1982 | Watanabe | 424/14 |
| 5,028,437 | 7/1991 | Jerrett | 514/867 |

FOREIGN PATENT DOCUMENTS 1963496 6/1971 Fed. Rep. of Germany .
2969586 7/1986 Japan .
3508980 9/1990 Japan .

OTHER PUBLICATIONS

Brinsted et al "Pickle and Sauce Making" London Food Trade Press (1965) p. 63.

Primary Examiner—Thurman K. Page
Assistant Examiner—D. Gabrielle Phelan
Attorney, Agent, or Firm—Abelman Frayne & Schwab

[57] ABSTRACT

There is disclosed a pharmaceutical composition for animals comprising at least one of a vinegar, a flesh of Japanese apricot, oranges, tomatoes and strawberries; and saccharides or a combination of saccharides and an edible organic acid, and optionally containing *Lactobacillus bifidus*.

13 Claims, No Drawings

PROCESS FOR PREVENTING DIARRHEA IN ANIMALS

This application is a continuation of application Ser. No. 539,629, filed Jun. 18, 1990, which is a continuation-in-part of Ser. No. 463,003, filed Jan. 8, 1990, which is a continuation of Ser. No. 142,914, filed Jan. 12, 1988, all now abandoned.

FIELD OF THE INVENTION

This invention relates to a pharmaceutical composition for animals excluding humans which is used alone or in admixture with water or with a feed stuff.

BACKGROUND OF THE INVENTION

In the breeding of animals, there are problems such as the frequent occurrence of diarrhea and other diseases. In general, there has been supplied to animals an antibiotic or a feed stuff containing an antibiotic to avoid those diseases. However, in such cases, it has been fairly difficult to prevent such diseases. Further, the application of a large quantity of the antibiotics to animals causes the remaining of the antibiotics in the body, eggs, milk and the like of animals. The remaining antibiotics bring harmful influences on people who take meats, eggs and milk containing the antibiotics to produce sometimes anti-drugs bacilli in the bodies of the people.

Now, we have found a safe pharmaceutical composition for animals which is based on natural materials and can prevent the frequent occurrence of diarrhea and other diseases of animals.

Therefore, it is an object of the present invention to provide a pharmaceutical composition for animals which is based on safe natural materials and which can step up the growth of the animals by the prevention of the frequent occurrence of diarrhea and other diseases of animals. A further object is to provide a pharmaceutical composition favored by animals. Another object is to provide a pharmaceutical composition for animals being safe for people who take meats, eggs and milks of the animals.

SUMMARY OF THE INVENTION

The present invention relates to a pharmaceutical composition for animals excluding humans comprising:
(A) at least one of a vinegar, a flesh of Japanese apricot (ume apricot), oranges and strawberries, and
(B) (i) saccharides or (ii) a combination of saccharides and an edible organic acid.

Further, the present invention relates to a pharmaceutical composition for animals excluding humans comprising:
(A) at least one of a vinegar, a flesh of Japanese apricot (ume apricot), oranges and strawberries,
(B) (i) saccharides or (ii) a combination of saccharides and an edible organic acid, and
(C) *Lactobacillus bifidus.*

Still further, the present invention relates to a method of supplying said pharmaceutical compositions to animals.

In addition, the present invention relates to a feed stuff for animals containing said pharmaceutical compositions.

DETAILED DESCRIPTION

The pharmaceutical composition of the present invention may be fed to animals excluding humans such as domestic animals, e.g. cattle, horse, pig, sheep, goat and the like; poultries, e.g. hen, cock, chicken, turkey, duck, guinea fowl, quail and the like; pets, e.g. dog, cat and the like; fishes, e.g. yellowtail, horse mackerel, flat fish, sea bream, red sea bream, eel, carp, rainbow trout, sweet fish, tilapia and the like.

In the present invention, both of a fermented vinegar and a synthesized vinegar may be used as the vinegar in component (A). A fermented vinegar, which includes rice vinegar, malt vinegar, alcohol vinegar, cider vinegar, wine vinegar or the like, is preferable. Both of liquid and solid vinegars may be used. A powdery vinegar is more preferable in the view point of easy handling and easy feeding to animals and the like.

The flesh of Japanese apricot used in said component (A) may be used in the smashed form or in the form of powder. Extractives from the flesh of Japanese apricot also may be used. The flesh of Japanese apricot may be one previously salted or dipped in alcohol. The raw flesh of Japanese apricot also may be used. However, when the raw flesh of Japanese apricot is used, it should be avoided that the raw flesh is contaminated with hydrocyanic acid contained in the stone of the raw Japanese apricot.

The oranges, tomatoes and strawberries may be used in the form of smashed form, powder, juice and the like. Further, a powdery rind of oranges may be used. As the oranges, there may be used lemons, satsuma mandarins, oranges, citron fruits and the like.

The vinegars, flesh of Japanese apricot, oranges, tomatoes and strawberries may be used alone or in admixture of two or more of them. They provide the pharmaceutical composition of the present invention with a good taste to make the animals take the composition readily. Especially, vinegars and the flesh of the Japanese apricot are preferable, and they may be used alone or in combination of them.

In the present invention, as the saccharides in said component (B), there may be used sugar, glucose, lactose, fruit sugar and the like, which may be used alone or in combination of them. Especially, sugar and glucose are preferable in view of the animal's favorite.

As edible organic acid in said component (B), any of animal-edible organic acids may be used. As examples of them, there may be used carboxylic acids such as citric acid, malic acid, fumaric acid, formic acid, succinic acid, tartaric acid, lactic acid and the like, which may be used alone or in combination of them. Among them, citric acid, fumaric acid and lactic aid are more preferable in the view points of the prevention of diarrhea and other diseases of animals and animal's favorite.

Some of those carboxylic acids are the same as carboxylic acids included in said vinegars, flesh of Japanese apricot, oranges, tomatoes and strawberries used as component (A) in the present invention. However, said "edible organic acid" used as component (B) in the present invention means a refined organic acid and is added into the feed composition of the present invention independently of said component (A). As said component (B), saccharides may be used alone or in admixture with the edible organic acid.

The occurrence of diseases of animals is more effectively prevented by the addition of Lactobacillus bifidus to the pharmaceutical composition comprising said components (A) and (B). Both of dried and undried Lactobacillus bifidus may be used.

In the present invention, a mix proportion of each component may vary depending on animal's kind, age, body weight and the like. In general, the pharmaceutical composition of the present invention comprises about 0.1–50% by weight of the component (A) and about 99.9–50% by weight of component (B). When mixtures of saccharides and the edible organic acid are used as the component (B) in the present invention, the pharmaceutical composition of the present invention comprises about 0.1–50% of at least one of the vinegar, flesh of Japanese apricot, oranges, tomatoes and strawberries, about 10–99.9% of the saccharides and about 1–60% of the edible organic acid based on the total weight of the pharmaceutical composition. When Lactobacillus bifidus is further added, in general, it is added in amounts of about $2.5 \times 10^{6-8}$ cells per 100 g of a dry basis of the components (A) and (B).

The preferable embodiments of the present invention are as follows:

In the following embodiments, "%" is based on the total weight of the composition.

(1) A pharmaceutical composition comprising 1–25% of the vinegar, 1–20% of the flesh of Japanese apricot, 15–95.5% of saccharide and 2.5–40% of the edible organic acid.

(2) A pharmaceutical composition comprising 1–25% of the vinegar and 75–99% of saccharides.

(3) A pharmaceutical composition comprising 1–20% of the flesh of the Japanese apricot and 80–99% of saccharides. (4) A pharmaceutical composition comprising 1–25% of the vinegar, 1–20% of the flesh of Japanese apricot and 55–98% of saccharides.

(5) A pharmaceutical composition comprising 1–25% of the vinegar, 1–20% of the flesh of Japanese apricot, 15–95.5% of saccharide and 2.5–40% of the edible organic acid and $2.5 \times 10^{8-10}$ cells of the *Lactobacillus bifidus* per 100 g on a dry basis of the vinegar, flesh of Japanese apricot, saccharides and edible organic acid.

(6) A pharmaceutical composition comprising 1–25% of the vinegar, 35–96.5% of saccharides and 2.5–40% of the edible organic acid and $2.5 \times 10^{8-10}$ cells of the *Lactobacillus bifidus* per 100 g on a dry basis of the vinegar, saccharides and edible organic acid.

(7) A pharmaceutical composition comprising 1–20% of the flesh of Japanese apricot. 40–96.5% of saccharides and 2.5–40% of the edible organic acid and $2.5 \times 10^{8-10}$ cells of the *Lactobacillus bifidus* per 100 g on a dry basis of the flesh of Japanese apricot, saccharides and edible organic acid.

Each component element is mixed according to any conventional methods.

The pharmaceutical composition for animals of the present invention may be solely fed to animals excluding humans. However, the pharmaceutical composition is more preferably fed to animals in the form of a solution or dispersion in water, or in admixture with a base feed stuff such as corns, wheat bran, wheat, wheat flour, soybean meal, milo, fish meal, fish powder, their mixture or the like. In such cases, about 0.1–10% of the pharmaceutical composition is generally added to water or the base feed stuff based on the weight of water or the feed stuff.

Further, the pharmaceutical composition may previously be mixed with the feed stuff.

In general, the pharmaceutical composition of the invention is fed to animals in the amount of about 0.01–10 g per 1 kg of the body weight of the animal. However, the amount may be varied.

Further, the pharmaceutical composition of the invention may be used in admixture with other therapeutic agents.

The pharmaceutical composition for animals of the invention can prevent more effectively the frequent occurrence of diarrhea, loose feces and other diseases than a composition consisting of saccharides and an edible organic acid. As the result, the pharmaceutical composition of the present invention can step up the growth of the animals.

The pharmaceutical composition of the present invention is based on only safe natural materials and thus is safe to animals and people who take meats, eggs, milk and the like of the animals, and animals take it favorably. The animals which take the pharmaceutical composition of the present invention provide us with good meats. When the pharmaceutical composition of the present invention is fed to cows, the production of milk increases, and the proportion of the milk fat in milk increases.

Further, the present pharmaceutical composition for animals can be fed to animals in admixture with other therapeutic agents.

The present invention described herein is illustrated by the following examples. These examples do not limit the present invention.

In the following examples, "Mean Mil Fat percentage" (called hereinafter "M.M.F. %"), "Proportion of Grown Animals" (called hereinafter "P.G.A."), "Increased Body Weight/animal·day" (called hereinafter "I.W./a.d.") and "Ingestion amount/animal·day" (called hereinafter "Ingestion") are calculated according to the following equations.

$$M.M.F. \ (\%) = \frac{\text{sum of milk fat percentages* of 180 pieces obtained by milking 30 cows 6 times a day}}{180}$$

$$\text{*milk fat percentage } (\%) = \frac{\text{amount of milk fat}}{\text{amount of whole milk}} \times 100$$

$$P.G.A. \ (\%) = \frac{\text{the number of animals living at the end of the test}}{\text{the number of animals at the beginning of the test}} \times 100$$

$$I.W./a.d. = \frac{\text{mean body weight of animals at the end of test} - \text{mean body weight of animals at the beginning of test}}{\text{total days for test}}$$

$$\text{Ingestion} = \frac{\text{amount of feed stuff ingested by animals of one test section}}{\text{test days} \times \text{the number of animals}}$$

In the following examples, a powdery rice vinegar (Mitsukansu Co.) was used as the vinegar, and a powdery flesh of Japanese apricot produced by Ikeda Touka Co. was used as the flesh of Japanese apricot, and powdery rind of lemon (Nankaikako Co.) was used as the lemon powder, and tomato powder produced by Spreader Co. was used as the tomato powder, and dried *Lactobacillus bifidus* (Oriental Koubo Co.) was used as the *Lactobacillus bifidus*.

EXAMPLES 1–94 AND COMPARATIVE EXAMPLES 1–38

Components shown in Table 1 below ere mixed in accordance with weight proportions shown in Table 1 to prepare pharmaceutical compositions for animals of the present Examples 1-94 and Comparative Examples 1-38.

Each pharmaceutical composition was diluted with water by way of a given magnification shown in Table 1, and then fed freely to animals instead of water. After a given test period, the total number of animals suffering from diarrhea and loose feces (called hereinafter "total D & L") was counted. The results are shown in Table 1 below.

TABLE 1-(i)

| | Mix proportions of each component in pharmaceutical composition for animals (wt. %) | | | | | Kind of animal | Number of animals | Feed periods (days) | Dilution (*) (times) | Results Total D&L/ total number of animals |
|---|---|---|---|---|---|---|---|---|---|---|
| | Sugar | Citric acid | Vinegar | Powdery flesh of Japanese apricot | Lactobacillus bifidus (cells/100 g) | | | | | |
| Example | | | | | | | | | | |
| 1 | 90 | 7.5 | 2.5 | | | Pig (4 weeks old) | 10 | 21 | 25 | 42/210 |
| 2 | 91.25 | 7.5 | | 1.25 | | Pig (4 weeks old) | 10 | 21 | 25 | 40/210 |
| 3 | 88.75 | 7.5 | 2.5 | 1.25 | | Pig (4 weeks old) | 10 | 21 | 25 | 20/210 |
| 4 | 90 | 7.5 | 2.5 | | $2.5 \times 10^8/100$ g | Pig (4 weeks old) | 10 | 21 | 25 | 30/210 |
| 5 | 91.25 | 7.5 | | 1.25 | $2.5 \times 10^8/100$ g | Pig (4 weeks old) | 10 | 21 | 25 | 31/210 |
| 6-A | 88.75 | 7.5 | 2.5 | 1.25 | $2.5 \times 10^8/100$ g | Pig (4 weeks old) | 10 | 21 | 25 | 15/210 |
| 6-B | 92.5 | | 7.5 | | | Pig (4 weeks old) | 10 | 21 | 25 | 41/210 |
| 6-C | 92.5 | | | 7.5 | $2.5 \times 10^8/100$ g | Pig (4 weeks old) | 10 | 21 | 25 | 40/210 |
| Comparative Example | | | | | | | | | | |
| 1 | 92.5 | 7.5 | | | | Pig (4 weeks old) | 10 | 21 | 25 | 71/210 |
| Example | | | | | | | | | | |
| 7 | 96.9 | 3 | 0.1 | | | Pig (4 weeks old) | 10 | 21 | 25 | 60/210 |
| 8 | 96.9 | 3 | | 0.1 | | Pig (4 weeks old) | 10 | 21 | 25 | 67/210 |
| 9 | 96.8 | 3 | 0.1 | 0.1 | | Pig (4 weeks old) | 10 | 21 | 25 | 50/210 |
| 10 | 96.9 | 3 | 0.1 | | $2.5 \times 10^6/100$ g | Pig (4 weeks old) | 10 | 21 | 25 | 52/210 |
| 11 | 96.9 | 3 | | 0.1 | $2.5 \times 10^6/100$ g | Pig (4 weeks old) | 10 | 21 | 25 | 53/210 |
| 12-A | 96.8 | 3 | 0.1 | 0.1 | $2.5 \times 10^6/100$ g | Pig (4 weeks old) | 10 | 21 | 25 | 45/210 |
| 12-B | 97 | | 3 | | $2.5 \times 10^6/100$ g | Pig (4 weeks old) | 10 | 21 | 25 | 59/210 |
| 12-C | 97 | | | 3 | | Pig (4 weeks old) | 10 | 21 | 25 | 60/210 |
| Comparative Example | | | | | | | | | | |
| 2 | 97 | 3 | | | | Pig (4 weeks old) | 10 | 21 | 25 | 75/210 |
| Example | | | | | | | | | | |
| 13 | 40 | 25 | 15 | 20 | | Pig (4 weeks old) | 10 | 21 | 25 | 30/210 |
| 14 | 55 | 25 | | 20 | | | 10 | 21 | 25 | 31/210 |
| 15 | 40 | 25 | 15 | 20 | | Pig (4 weeks old) | 10 | 21 | 25 | 12/210 |
| 16 | 60 | 25 | 15 | | $2.5 \times 10^{10}/100$ g | Pig (4 weeks old) | 10 | 21 | 25 | 22/210 |
| 17 | 55 | 25 | | 20 | $2.5 \times 10^{10}/100$ g | Pig (4 weeks old) | 10 | 21 | 25 | 21/210 |
| 18-A | 40 | 25 | 15 | 20 | $2.5 \times 10^{10}/100$ g | Pig (4 weeks old) | 10 | 21 | 25 | 8/210 |
| 18-B | 75 | | 25 | | | Pig (4 weeks old) | 10 | 21 | 25 | 29/210 |
| 18-C | 75 | | 5 | 20 | $2.5 \times 10^{10}/100$ g | Pig (4 weeks old) | 10 | 21 | 25 | 31/210 |

TABLE 1-(i)-continued

| | Mix proportions of each component in pharmaceutical composition for animals (wt. %) | | | | | Kind of animal | Number of animals | Feed periods (days) | Dilution (*) (times) | Results Total D&L/ total number of animals |
|---|---|---|---|---|---|---|---|---|---|---|
| | Sugar | Citric acid | Vinegar | Powdery flesh of Japanese apricot | *Lactobacillus bifidus* (cells/100 g) | | | | | |
| Comparative Example 3 | 75 | 25 | | | | Pig (4 weeks old) | 10 | 21 | 25 | 60/210 |
| Example | | | | | | | | | | |
| 19 | 90 | 7.5 | 2.5 | | | Calf (2 weeks old) | 10 | 21 | 25 | 50/210 |
| 20 | 91.25 | 7.5 | | 1.25 | | Calf (2 weeks old) | 10 | 21 | 25 | 49/210 |
| 21 | 88.75 | 7.5 | 2.5 | 1.25 | | Calf (2 weeks old) | 10 | 21 | 25 | 25/210 |
| 22-A | 90 | 7.5 | 2.5 | | $2.5 \times 10^8$/100 g | Calf (2 weeks old) | 10 | 21 | 25 | 32/210 |
| 22-B | 92.5 | | 7.5 | | $2.5 \times 10^8$/100 g | Calf (2 weeks old) | 10 | 21 | 25 | 48/210 |
| 22-C | 92.5 | | | 7.5 | | Calf (2 weeks old) | 10 | 21 | 25 | 50/210 |
| Comparative Example 4 | 92.5 | 7.5 | | | | Calf (2 weeks old) | 10 | 21 | 25 | 108/210 |
| Example | | | | | | | | | | |
| 23 | 96.9 | 3 | 0.1 | | | Calf (2 weeks old) | 10 | 21 | 25 | 60/210 |
| 24 | 96.9 | 3 | | 0.1 | | Calf (2 weeks old) | 10 | 21 | 25 | 56/210 |
| 25 | 96.8 | 3 | 0.1 | 0.1 | | Calf (2 weeks old) | 10 | 21 | 25 | 34/210 |
| 26-A | 96.9 | 3 | 0.1 | | $2.5 \times 10^8$/100 g | Calf (2 weeks old) | 10 | 21 | 25 | 40/210 |
| 26-B | 97 | | 3 | | | Calf (2 weeks old) | 10 | 21 | 25 | 57/210 |
| 26-C | 97 | | | 3 | $2.5 \times 10^8$/100 g | Calf (2 weeks old) | 10 | 21 | 25 | 59/210 |
| Comparative Example 5 | 97 | 3 | | | | Calf (2 weeks old) | 10 | 21 | 25 | 98/210 |
| Example | | | | | | | | | | |
| 27 | 40 | 25 | 15 | 20 | | Calf (2 weeks old) | 10 | 21 | 100 | 60/210 |
| 28-A | 60 | 25 | 15 | | $2.5 \times 10^{10}$/100 g | Calf (2 weeks old) | 10 | 21 | 100 | 44/210 |
| 28-B | 75 | | 25 | | $2.5 \times 10^{10}$/100 g | Calf (2 weeks old) | 10 | 21 | 100 | 61/210 |
| 28-C | 75 | | 5 | 20 | | Calf (2 weeks old) | 10 | 21 | 100 | 58/210 |
| Comparative Example 6 | 75 | 25 | | | | Calf (2 weeks old) | 10 | 21 | 100 | 101/210 |
| Example | | | | | | | | | | |
| 29 | 90 | 7.5 | 2.5 | | | Lamb (4 weeks old) | 10 | 28 | 25 | 22/280 |
| 30 | 91.25 | 7.5 | | 1.25 | | Lamb (4 weeks old) | 10 | 28 | 25 | 20/280 |
| 31 | 88.75 | 7.5 | 2.5 | 1.25 | | Lamb (4 weeks old) | 10 | 28 | 25 | 10/280 |
| 32-A | 90 | 7.5 | 2.5 | | $2.5 \times 10^8$/100 g | Lamb (4 weeks old) | 10 | 28 | 25 | 15/280 |
| 32-B | 92.5 | | 7.5 | | | Lamb (4 weeks old) | 10 | 28 | 25 | 23/280 |
| 32-C | 92.5 | | | 7.5 | $2.5 \times 10^8$/100 g | Lamb (4 weeks old) | 10 | 28 | 25 | 20/280 |
| Comparative Example 7 | 92.5 | 7.5 | | | | Lamb (4 weeks old) | 10 | 28 | 25 | 62/280 |

TABLE 1-(i)-continued

| | Mix proportions of each component in pharmaceutical composition for animals (wt. %) | | | | | Kind of animal | Number of animals | Feed periods (days) | Dilution (*) (times) | Results Total D&L/ total number of animals |
|---|---|---|---|---|---|---|---|---|---|---|
| | Sugar | Citric acid | Vinegar | Powdery flesh of Japanese apricot | *Lactobacillus bifidus* (cells/100 g) | | | | | |
| Example | | | | | | | | | | |
| 33 | 96.9 | 3 | 0.1 | | | Lamb (4 weeks old) | 10 | 28 | 25 | 32/280 |
| 34 | 96.9 | 3 | | 0.1 | | Lamb (4 weeks old) | 10 | 28 | 25 | 30/280 |
| 35 | 96.8 | 3 | 0.1 | 0.1 | | Lamb (4 weeks old) | 10 | 28 | 25 | 20/280 |
| 36-A | 96.9 | 3 | 0.1 | | $2.5 \times 10^8/100$ g | Lamb (4 weeks old) | 10 | 28 | 25 | 29/280 |
| 36-B | 97 | | 3 | | $2.5 \times 10^8/100$ g | Lamb (4 weeks old) | 10 | 28 | 25 | 31/280 |
| 36-C | 97 | | | 3 | | Lamb (4 weeks old) | 10 | 28 | 25 | 33/280 |
| Comparative Example | | | | | | | | | | |
| 8 | 97.0 | 3 | | | | Lamb (4 weeks old) | 10 | 28 | 25 | 60/280 |
| Example | | | | | | | | | | |
| 37 | 40 | 25 | 15 | 20 | | Lamb (4 weeks old) | 10 | 28 | 100 | 40/280 |
| 38-A | 60 | 25 | 15 | | $2.5 \times 10^{10}/100$ g | Lamb (4 weeks old) | 10 | 28 | 100 | 36/280 |
| 38-B | 75 | 25 | | | | Lamb (4 weeks old) | 10 | 28 | 100 | 38/280 |
| 38-C | 75 | 5 | | 20 | $2.5 \times 10^{10}/100$ g | Lamb (4 weeks old) | 10 | 28 | 100 | 40/280 |
| Comparative Example | | | | | | | | | | |
| 9 | 75 | 25 | | | | Lamb (4 weeks old) | 10 | 28 | 100 | 61/280 |
| Example | | | | | | | | | | |
| 39 | 90 | 7.5 | 2.5 | | | Chicken (3 weeks old) | 200 | 35 | 25 | 423/7000 |
| 40 | 91.25 | 7.5 | | 1.25 | | Chicken (3 weeks old) | 200 | 35 | 25 | 403/7000 |
| 41 | 88.75 | 7.5 | 2.5 | 1.25 | | Chicken (3 weeks old) | 200 | 35 | 25 | 198/7000 |
| 42-A | 90 | 7.5 | 2.5 | | $2.5 \times 10^8/100$ g | Chicken (3 weeks old) | 200 | 35 | 25 | 309/7000 |
| 42-B | 92.5 | | 7.5 | | $2.5 \times 10^8/100$ g | Chicken (3 weeks old) | 200 | 35 | 25 | 403/7000 |
| 42-C | 92.5 | | | 7.5 | | Chicken (3 weeks old) | 200 | 35 | 25 | 394/7000 |
| Comparative Example | | | | | | | | | | |
| 10 | 92.5 | 7.5 | | | | Chicken (3 weeks old) | 200 | 35 | 25 | 1066/7000 |
| Example | | | | | | | | | | |
| 43 | 96.9 | 3 | 0.1 | | | Chicken (3 weeks old) | 200 | 35 | 25 | 603/7000 |
| 44 | 96.9 | 3 | 0.1 | | | Chicken (3 weeks old) | 200 | 35 | 25 | 600/7000 |
| 45 | 96.8 | 3 | 0.1 | 0.1 | | Chicken (3 weeks old) | 200 | 35 | 25 | 503/7000 |
| 46-A | 96.9 | 3 | 0.1 | | $2.5 \times 10^8/100$ g | Chicken (3 weeks old) | 200 | 35 | 25 | 621/7000 |
| 46-B | 97 | | 3 | | | Chicken (3 weeks old) | 200 | 35 | 25 | 634/7000 |
| 46-C | 97 | | | 3 | $2.5 \times 10^8/100$ g | Chicken (3 weeks old) | 200 | 35 | 25 | 611/7000 |
| Comparative Example | | | | | | | | | | |
| 11 | 97.0 | 3 | | | | Chicken (3 weeks old) | 200 | 35 | 25 | 1050/7000 |
| Example | | | | | | | | | | |
| 47 | 40 | 25 | 15 | 20 | | Chicken (3 weeks old) | 200 | 35 | 100 | 611/7000 |

TABLE 1-(i)-continued

| | Mix proportions of each component in pharmaceutical composition for animals (wt. %) | | | | | | | | | Results |
|---|---|---|---|---|---|---|---|---|---|---|
| | Sugar | Citric acid | Vinegar | Powdery flesh of Japanese apricot | Lactobacillus bifidus (cells/100 g) | Kind of animal | Number of animals | Feed periods (days) | Dilution (*) (times) | Total D&L/ total number of animals |
| 48-A | 60 | 25 | 15 | | $2.5 \times 10^{10}/100$ g | Chicken (3 weeks old) | 200 | 35 | 100 | 601/7000 |
| 48-B | 75 | | 25 | | $2.5 \times 10^{10}/100$ g | Chicken (3 weeks old) | 200 | 35 | 100 | 641/7000 |
| 48-C | 75 | | 24 | 1 | | Chicken (3 weeks old) | 200 | 35 | 100 | 636/7000 |
| Comparative Example 12 | 75 | 25 | | | | Chicken (3 weeks old) | 200 | 35 | 100 | 1023/7000 |
| Example 49 | 90 | 7.5 | 2.5 | | | Dog (65 days old) | 20 | 35 | 25 | 40/700 |
| 50 | 91.25 | 7.5 | | 1.25 | | Dog (65 days old) | 20 | 35 | 25 | 45/700 |
| 51 | 88.75 | 7.5 | 2.5 | 1.25 | | Dog (65 days old) | 20 | 35 | 25 | 25/700 |
| 52-A | 90 | 7.5 | 2.5 | | $2.5 \times 10^8/100$ g | Dog (65 days old) | 20 | 35 | 25 | 36/700 |
| 52-B | 92.5 | | 7.5 | | | Dog (65 days old) | 20 | 35 | 25 | 41/700 |
| 52-C | 92.5 | | | 7.5 | $2.5 \times 10^8/100$ g | Dog (65 days old) | 20 | 35 | 25 | 50/700 |
| Comparative Example 13 | 92.5 | 7.5 | | | | Dog (65 days old) | 20 | 35 | 25 | 141/700 |
| Example 53 | 96.9 | 3 | 0.1 | | | Dog (65 days old) | 20 | 35 | 25 | 62/700 |
| 54 | 96.9 | 3 | | 0.1 | | Dog (65 days old) | 20 | 35 | 25 | 64/700 |
| 55 | 96.8 | 3 | 0.1 | 0.1 | | Dog (65 days old) | 20 | 35 | 25 | 50/700 |
| 56-A | 96.9 | 3 | 0.1 | | $2.5 \times 10^8/100$ g | Dog (65 days old) | 20 | 35 | 25 | 50/700 |
| 56-B | 97 | | 3 | | $2.5 \times 10^8/100$ g | Dog (65 days old) | 20 | 35 | 25 | 66/700 |
| 56-C | 97 | | | 3 | | Dog (65 days old) | 20 | 35 | 25 | 58/700 |
| Comparative Example 14 | 97 | 3 | | | | Dog (65 days old) | 20 | 35 | 25 | 120/700 |
| Example 57 | 40 | 25 | 15 | 20 | | Dog (65 days old) | 20 | 35 | 100 | 70/700 |
| 58-A | 60 | 25 | 15 | | $2.5 \times 10^{10}/100$ g | Dog (65 days old) | 20 | 35 | 100 | 72/700 |
| 58-B | 75 | | 5 | 20 | | Dog (65 days old) | 20 | 35 | 100 | 60/700 |
| 58-C | 75 | | 24 | 1 | $2.5 \times 10^{10}/100$ g | Dog (65 days old) | 20 | 35 | 100 | 65/700 |
| Comparative Example 15 | 75 | 25 | | | | Dog (65 days old) | 20 | 35 | 100 | 112/700 |
| Example 59 | 10 | 50 | 30 | 10 | | Dog (65 days old) | 20 | 35 | 100 | 62/700 |
| 60 | 10 | 50 | 15 | 25 | | Dog (65 days old) | 20 | 35 | 100 | 59/700 |
| 61-A | 88 | 1 | 1 | 10 | | Dog (65 days old) | 20 | 35 | 100 | 56/700 |
| 61-B | 99 | | 1 | | | Dog (65 days old) | 20 | 35 | 100 | 60/700 |
| 61-C | 99 | | | 1 | | Dog (65 days old) | 20 | 35 | 100 | 63/700 |

TABLE 1-(i)-continued

| | Mix proportions of each component in pharmaceutical composition for animals (wt. %) | | | | | | | | Results |
|---|---|---|---|---|---|---|---|---|---|
| | Sugar | Citric acid | Vinegar | Powdery flesh of Japanese apricot | *Lactobacillus bifidus* (cells/100 g) | Kind of animal | Number of animals | Feed periods (days) | Dilution (*) (times) | Total D&L/ total number of animals |
| Comparative Example | | | | | | | | | |
| 16 | 10 | 90 | | | | Dog (65 days old) | 20 | 35 | 100 | 116/700 |
| 17 | 50 | 50 | | | | Dog (65 days old) | 20 | 35 | 100 | 109/700 |
| 18 | 99 | 1 | | | | Dog (65 days old) | 20 | 35 | 100 | 113/700 |

(*) Water dilution magnification (times)

TABLE 1-(ii)

| | Mix proportions of each component in pharmaceutical composition for animals (wt. %) | | | | | | | | Results |
|---|---|---|---|---|---|---|---|---|---|
| | Glucose | Lactic acid | Vinegar | Powdery rind of lemon | Kind of animal | Number of animals | Feed periods (days) | Dilution (*) (times) | Total D&L/ total number of animals |
| Example | | | | | | | | | |
| 62 | 10 | 50 | 30 | 10 | Dog (65 days old) | 20 | 35 | 100 | 60/700 |
| 63 | 10 | 50 | 15 | 25 | Dog (65 days old) | 20 | 35 | 100 | 58/700 |
| 64 | 88 | 1 | 1 | 10 | Dog (65 days old) | 20 | 35 | 100 | 61/700 |
| 65 | 98.9 | 1 | | 0.1 | Dog (65 days old) | 20 | 35 | 100 | 57/700 |
| 66-A | 88.75 | 7.5 | 2.5 | 1.25 | Dog (65 days old) | 20 | 35 | 100 | 40/700 |
| 66-B | 92.5 | | 2.5 | 5 | Dog (65 days old) | 20 | 35 | 100 | 61/700 |
| 66-C* | 92.5 | | | | Dog (65 days old) | 20 | 35 | 100 | 64/700 |
| Comparative Example | | | | | | | | | |
| 19 | 10 | 90 | | | Dog (65 days old) | 20 | 35 | 100 | 100/700 |
| 20 | 50 | 50 | | | Dog (65 days old) | 20 | 35 | 100 | 110/700 |
| 21 | 99 | 1 | | | Dog (65 days old) | 20 | 35 | 100 | 108/700 |
| 22 | 92.5 | 7.5 | | | Dog (65 days old) | 20 | 35 | 100 | 110/700 |

(*) Water dilution magnification (times)
*In addition to glucose, 2.5 wt. % of powdery flesh of Japanese apricot and 50 wt. % of powdery tomato are mixed.

TABLE 1-(iii)

| | Mix proportions of each component in pharmaceutical composition for animals (wt. %) | | | | | | | | Results |
|---|---|---|---|---|---|---|---|---|---|
| | Glucose | Fumaric acid | Vinegar | Powdery tomato | Kind of animal | Number of animals | Feed periods (days) | Dilution (*) (times) | Total D&L/ total number of animals |
| Example | | | | | | | | | |
| 67 | 10 | 50 | 30 | 10 | Dog (65 days old) | 20 | 35 | 100 | 61/700 |
| 68 | 10 | 50 | 15 | 25 | Dog (65 days old) | 20 | 35 | 100 | 63/700 |
| 69 | 88 | 1 | 1 | 10 | Dog (65 days old) | 20 | 35 | 100 | 60/700 |
| 70 | 98.9 | 1 | | 0.1 | Dog (65 days old) | 20 | 35 | 100 | 58/700 |
| 71-A | 88.75 | 7.5 | 2.5 | 1.25 | Dog (65 days old) | 20 | 35 | 100 | 38/700 |
| 71-B*2 | 99 | | | | Dog (65 days old) | 20 | 35 | 100 | 60/700 |
| 71-C | 99 | | | 1 | Dog (65 days old) | 20 | 35 | 100 | 59/700 |
| Comparative Example | | | | | | | | | |
| 23 | 10 | 90 | | | Dog (65 days old) | 20 | 35 | 100 | 101/700 |
| 24 | 50 | 50 | | | Dog (65 days old) | 20 | 35 | 100 | 105/700 |

TABLE 1-(iii)-continued

| | Mix proportions of each component in pharmaceutical composition for animals (wt. %) | | | | Kind of animal | Number of animals | Feed periods (days) | Dilution (*) (times) | Results Total D&L/ total number of animals |
|---|---|---|---|---|---|---|---|---|---|
| | Glucose | Fumaric acid | Vinegar | Powdery tomato | | | | | |
| 25 | 99 | 1 | | | Dog (65 days old) | 20 | 35 | 100 | 109/700 |

(*) Water dilution magnification (times)
*²In addition to 99 wt. % of glucose, 1 wt. % of powdery rind of lemon is mixed.

TABLE 1-(iv)

| | Mix proportions of each component in pharmaceutical composition for animals (wt. %) | | | | | Kind of animal | Number of animals | Feed periods (days) | Dilution (*) (times) | Results Total D&L/ total number of animals |
|---|---|---|---|---|---|---|---|---|---|---|
| | Sugar | Citric acid | Vinegar | Powdery flesh of Japanese apricot | Lactobacillus bifidus (cells/100 g) | | | | | |
| Example | | | | | | | | | | |
| 72 | 90 | 7.5 | 2.5 | | | Cat (60 days old) | 20 | 35 | 25 | 21/700 |
| 73 | 91.25 | 7.5 | | 1.25 | | Cat (60 days old) | 20 | 35 | 25 | 22/700 |
| 74 | 88.75 | 7.5 | 2.5 | 1.25 | | Cat (60 days old) | 20 | 35 | 25 | 14/700 |
| 75-A | 90 | 7.5 | 2.5 | | $2.5 \times 10^8/100$ g | Cat (60 days old) | 20 | 35 | 25 | 20/700 |
| 75-B | 92.5 | | 7.5 | | | Cat (60 days old) | 20 | 35 | 25 | 23/700 |
| 75-C | 92.5 | | | 7.5 | $2.5 \times 10^8/100$ g | Cat (60 days old) | 20 | 35 | 25 | 25/700 |
| Comparative Example | | | | | | | | | | |
| 26 | 92.5 | 7.5 | | | | Cat (60 days old) | 20 | 21 | 25 | 85/700 |
| Example | | | | | | | | | | |
| 76 | 96.9 | 3 | 0.1 | | | Cat (60 days old) | 20 | 35 | 25 | 50/700 |
| 77 | 96.9 | 3 | | 0.1 | | Cat (60 days old) | 20 | 35 | 25 | 51/700 |
| 78 | 96.8 | 3 | 0.1 | 0.1 | | Cat (60 days old) | 20 | 35 | 25 | 40/700 |
| 79-A | 96.9 | 3 | 0.1 | | $2.5 \times 10^8/100$ g | Cat (60 days old) | 20 | 35 | 25 | 49/700 |
| 79-B | 97 | | 3 | | $2.5 \times 10^8/100$ g | Cat (60 days old) | 20 | 35 | 25 | 52/700 |
| 79-C | 97 | | | 3 | | Cat (60 days old) | 20 | 35 | 25 | 54/700 |
| Comparative Example | | | | | | | | | | |
| 27 | 97 | 3 | | | | Cat (60 days old) | 20 | 35 | 25 | 81/700 |
| Example | | | | | | | | | | |
| 80 | 40 | 25 | 15 | 20 | | Cat (60 days old) | 20 | 35 | 100 | 47/700 |
| 81-A | 60 | 25 | 15 | | $2.5 \times 10^{10}/100$ g | Cat (60 days old) | 20 | 35 | 100 | 44/700 |
| 81-B | 75 | | 5 | 20 | | Cat (60 days old) | 20 | 35 | 100 | 46/700 |
| 81-C*³ | 75 | | | | $2.5 \times 10^{10}/100$ g | Cat (60 days old) | 20 | 35 | 100 | 47/700 |
| Comparative Example | | | | | | | | | | |
| 28 | 75 | 25 | | | | Cat (60 days old) | 20 | 35 | 100 | 76/700 |
| Example | | | | | | | | | | |
| 82 | 10 | 50 | 30 | 10 | | Cat (60 days old) | 20 | 35 | 100 | 50/700 |
| 83 | 10 | 50 | 15 | 25 | | Cat (60 days old) | 20 | 35 | 100 | 51/700 |
| 84-A | 88 | 1 | 1 | 10 | | Cat (60 days old) | 20 | 35 | 100 | 48/700 |
| 84-B | 99 | | 1 | | | Cat (60 days old) | 20 | 35 | 100 | 49/700 |
| 84-C | 99 | | | 1 | | Cat (60 days old) | 20 | 35 | 100 | 52/700 |

TABLE 1-(iv)-continued

| | Mix proportions of each component in pharmaceutical composition for animals (wt. %) | | | | | Kind of animal | Number of animals | Feed periods (days) | Dilution (*) (times) | Results Total D&L/ total number of animals |
|---|---|---|---|---|---|---|---|---|---|---|
| | Sugar | Citric acid | Vinegar | Powdery flesh of Japanese apricot | Lactobacillus bifidus (cells/100 g) | | | | | |
| Comparative Example | | | | | | | | | | |
| 29 | 10 | 90 | | | | Cat (60 days old) | 20 | 35 | 100 | 81/700 |
| 30 | 50 | 50 | | | | Cat (60 days old) | 20 | 35 | 100 | 85/700 |
| 31 | 99 | 1 | | | | Cat (60 days old) | 20 | 35 | 100 | 80/700 |

(*) Water dilution magnification (times)
*³In addition to 75 wt. % of sugar and 2.5 × 10¹⁰/100 g of Lactobacillus bifidus, 5 wt. % of powdery rind of lemon and 20 wt. % of powdery tomato are mixed.

TABLE 1-(v)

| | Mix proportions of each component in pharmaceutical composition for animals (wt. %) | | | | Kind of animal | Number of animals | Feed periods (days) | Dilution (*) (times) | Results Total D&L/ total number of animals |
|---|---|---|---|---|---|---|---|---|---|
| | Glucose | Lactic acid | Vinegar | Powdery rind of lemon | | | | | |
| Example | | | | | | | | | |
| 85 | 10 | 50 | 30 | 10 | Cat (60 days old) | 20 | 35 | 100 | 48/700 |
| 86 | 10 | 50 | 15 | 25 | Cat (60 days old) | 20 | 35 | 100 | 47/700 |
| 87 | 88 | 1 | 1 | 10 | Cat (60 days old) | 20 | 35 | 100 | 49/700 |
| 88 | 98.9 | 1 | | 0.1 | Cat (60 days old) | 20 | 35 | 100 | 48/700 |
| 89-A | 88.75 | 7.5 | 2.5 | 1.25 | Cat (60 days old) | 20 | 35 | 100 | 25/700 |
| 89-B | 99 | | 1 | | Cat (60 days old) | 20 | 35 | 100 | 50/700 |
| 89-C*⁴ | 99 | | 1 | | Cat (60 days old) | 20 | 35 | 100 | 52/700 |
| 89-D*⁵ | 92.5 | 5 | | | Cat (60 days old) | 20 | 35 | 100 | 48/700 |
| 89-E*⁶ | 92.5 | | | 5 | Cat (60 days old) | 20 | 35 | 100 | 49/700 |
| Comparative Example | | | | | | | | | |
| 32 | 10 | 90 | | | Cat (60 days old) | 20 | 35 | 100 | 89/700 |
| 33 | 50 | 50 | | | Cat (60 days old) | 20 | 35 | 100 | 90/700 |
| 34 | 99 | 1 | | | Cat (60 days old) | 20 | 35 | 100 | 88/700 |
| 35 | 92.5 | 7.5 | | | Cat (60 days old) | 20 | 35 | 100 | 89/700 |

(*) Water dilution magnification (times)
*⁴In addition to 99 wt. % of glucose, 1 wt. % of powdery flesh of Japanese apricot is mixed.
*⁵In addition to 92.5 wt. % of glucose and 5 wt. % of vinegar, 2.5 wt. % of powdery flesh of Japanese apricot is mixed.
*⁶In addition to 92.5 wt. % of glucose and 5 wt. % of powdery rind of lemon, 2.5 wt. % of powdery tomato is mixed.

TABLE 1-(vi)

| | Mix proportions of each component in pharmaceutical composition for animals (wt. %) | | | | Kind of animal | Number of animals | Feed periods (days) | Dilution (*) (times) | Results Total D&L/ total number of animals |
|---|---|---|---|---|---|---|---|---|---|
| | Glucose | Fumaric acid | Vinegar | Powdery tomato | | | | | |
| Example | | | | | | | | | |
| 90 | 10 | 50 | 30 | 10 | Cat (60 days old) | 20 | 35 | 100 | 43/700 |
| 91 | 10 | 50 | 15 | 25 | Cat (60 days old) | 20 | 35 | 100 | 48/700 |
| 92 | 88 | 1 | 1 | 10 | Cat (60 days old) | 20 | 35 | 100 | 49/700 |
| 93 | 98.9 | 1 | | 0.1 | Cat (60 days old) | 20 | 35 | 100 | 47/700 |
| 94-A | 88.75 | 7.5 | 2.5 | 1.25 | Cat (60 days old) | 20 | 35 | 100 | 28/700 |
| 94-B*⁷ | 99 | | | | Cat (60 days old) | 20 | 35 | 100 | 51/700 |
| 94-C | 99 | | | 1 | Cat (60 days old) | 20 | 35 | 100 | 53/700 |

TABLE 1-(vi)-continued

| | Mix proportions of each component in pharmaceutical composition for animals (wt. %) | | | | Kind of animal | Number of animals | Feed periods (days) | Dilution (*) (times) | Results Total D&L/ total number of animals |
|---|---|---|---|---|---|---|---|---|---|
| | Glucose | Fumaric acid | Vinegar | Powdery tomato | | | | | |
| Comparative Example | | | | | days old) | | | | |
| 36 | 10 | 90 | | | Cat (60 days old) | 20 | 35 | 100 | 90/700 |
| 37 | 50 | 50 | | | Cat (60 days old) | 20 | 35 | 100 | 87/700 |
| 38 | 99 | 1 | | | Cat (60 days old) | 20 | 35 | 100 | 88/700 |

(*) Water dilution magnification (times)
*7 In addition to 99 wt. % of glucose, 1 wt. % of powdery rind of lemon is mixed.

EXAMPLES 95–114 AND COMPARATIVE EXAMPLES 39–44

Components shown in Table 2 below were mixed in accordance with weight proportions shown in Table 2 to prepare pharmaceutical compositions for animals of the present Examples 95–114 and Comparative Examples 39–44.

Each of the pharmaceutical composition for animals was added to Base Feed Stuff A or B shown below at a given weight proportion shown in Table 2 to prepare test feed stuffs. Each of the test feed stuffs was fed to animals freely. "I.W./a.d." and "Ingestion" were determined. The results are shown in Table 2 below.

| Composition of Base Feed Stuff A | |
|---|---|
| Corn | 450 weight parts |
| Milo | 310 weight parts |
| Soybean meal | 146 weight parts |
| Rapeseed meal | 30 weight parts |
| Fish powder | 15 weight parts |
| Meat born meal | 10 weight parts |
| Yellow grease | 18 weight parts |
| Calcium carbonate | 5 weight parts |
| Calcium phosphate | 8 weight parts |
| Salt | 3 weight parts |
| Premix vitamins & minerals | 5 weight parts |

| Composition of Base Feed Stuff B | |
|---|---|
| Corn | 300 weight parts |
| Milo | 135 weight parts |
| Wheat bran | 70 weight parts |
| Soybean meal | 246 weight parts |
| Wheat flour | 180 weight parts |
| Yellow grease | 7 weight parts |
| Molasses | 30 weight parts |
| Calcium carbonate | 14.5 weight parts |
| Calcium triphosphate | 11 weight parts |
| Salt | 5 weight parts |
| Vitamins and Minerals | 1.5 weight parts |

TABLE 2

| | Mix proportions of each component in pharmaceutical composition for animals (wt. %) | | | | | Kind of animal | Number of animals | Feed periods (days) | K.B.F.S.* | P.F.B.** (wt. %) | I.W./ a.d. (g) | Ingestion (g) |
|---|---|---|---|---|---|---|---|---|---|---|---|---|
| | Sugar | Citric acid | Vinegar | Powdery flesh of Japanese apricot | *Lactobacillus bifidus* (cells/100 g) | | | | | | | |
| Example | | | | | | | | | | | | |
| 95 | 90 | 7.5 | 2.5 | | | Pig (4 weeks old) | 20 | 14 | A | 2 | 471 | 500 |
| 96 | 91.25 | 7.5 | | 1.25 | | Pig (4 weeks old) | 20 | 14 | A | 2 | 464 | 490 |
| 97 | 88.75 | 7.5 | 2.5 | 1.25 | | Pig (4 weeks old) | 20 | 14 | A | 2 | 468 | 510 |
| 98-A | 90 | 7.5 | 2.5 | | 2.5 × 10⁸/100 g | Pig (4 weeks old) | 20 | 14 | A | 2 | 479 | 508 |
| 98-B | 92.5 | 7.5 | | | 2.5 × 10⁸/100 g | Pig (4 weeks old) | 20 | 14 | A | 2 | 469 | 511 |
| 98-C | 92.5 | | 7.5 | | | Pig (4 weeks old) | 20 | 14 | A | 2 | 465 | 506 |
| Comparative Example | | | | | | | | | | | | |
| 39 | 92.5 | 7.5 | | | | Pig (4 weeks old) | 20 | 14 | A | 2 | 386 | 435 |
| Example | | | | | | | | | | | | |

TABLE 2-continued

| | Mix proportions of each component in pharmaceutical composition for animals (wt. %) | | | | | Kind of animal | Number of animals | Feed periods (days) | K.B.F.S.* | P.F.B.** (wt. %) | I.W./ a.d. (g) | Ingestion (g) |
|---|---|---|---|---|---|---|---|---|---|---|---|---|
| | Sugar | Citric acid | Vinegar | Powdery flesh of Japanese apricot | *Lactobacillus bifidus* (cells/100 g) | | | | | | | |
| 99 | 96.9 | 3 | 0.1 | | | Pig (4 weeks old) | 20 | 14 | A | 2 | 464 | 491 |
| 100 | 96.9 | 3 | | 0.1 | | Pig (4 weeks old) | 20 | 14 | A | 2 | 450 | 481 |
| 101 | 96.8 | 3 | 0.1 | 0.1 | | Pig (4 weeks old) | 20 | 14 | A | 2 | 460 | 498 |
| 102-A | 96.9 | 3 | 0.1 | | $2.5 \times 10^8/100$ g | Pig (4 weeks old) | 20 | 14 | A | 2 | 455 | 490 |
| 102-B | 97 | | 3 | | | Pig (4 weeks old) | 20 | 14 | A | 2 | 450 | 480 |
| 102-C | 97 | | | 3 | $2.5 \times 10^8/100$ g | Pig (4 weeks old) | 20 | 14 | A | 2 | 448 | 478 |
| Comparative Example 40 | 97 | 3 | | | | Pig (4 weeks old) | 20 | 14 | A | 2 | 388 | 440 |
| Example 103 | 40 | 25 | 15 | 20 | | Pig (4 weeks old) | 20 | 14 | A | 2 | 453 | 486 |
| 104-A | 60 | 25 | 15 | | $2.5 \times 10^{10}/100$ g | Pig (4 weeks old) | 20 | 14 | A | 2 | 451 | 483 |
| 104-B | 75 | | 25 | | $2.5 \times 10^{10}/100$ g | Pig (4 weeks old) | 20 | 14 | A | 2 | 448 | 478 |
| 104-C | 75 | | 5 | 20 | | Pig (4 weeks old) | 20 | 14 | A | 2 | 446 | 479 |
| Comparative Example 41 | 75 | 25 | | | | Pig (4 weeks old) | 20 | 14 | A | 2 | 398 | 456 |
| Example 105 | 90 | 7.5 | 2.5 | | | Calf (3 weeks old) | 20 | 21 | B | 4 | 1029 | 1780 |
| 106 | 91.25 | 7.5 | | 1.25 | | Calf (3 weeks old) | 20 | 21 | B | 4 | 1038 | 1769 |
| 107 | 88.75 | 7.5 | 2.5 | 1.25 | | Calf (3 weeks old) | 20 | 21 | B | 4 | 1043 | 1779 |
| 108-A | 90 | 7.5 | 2.5 | | $2.5 \times 10^8/100$ g | Calf (3 weeks old) | 20 | 21 | B | 4 | 1029 | 1768 |
| 108-B | 92.5 | | 7.5 | | | Calf (3 weeks old) | 20 | 21 | B | 4 | 1021 | 1760 |
| 108-C | 92.5 | | | 7.5 | $2.5 \times 10^8/100$ g | Calf (3 weeks old) | 20 | 21 | B | 4 | 1016 | 1758 |
| Comparative Example 42 | 92.5 | 7.5 | | | | Calf (3 weeks old) | 20 | 21 | B | 4 | 880 | 1680 |
| Example 109 | 96.9 | 3 | 0.1 | | | Calf (3 | 20 | 21 | B | 4 | 991 | 1769 |

TABLE 2-continued

| | Mix proportions of each component in pharmaceutical composition for animals (wt. %) | | | | | Kind of animal | Number of animals | Feed periods (days) | K.B.F.S.* | P.F.B.** (wt. %) | I.W./ a.d. (g) | In-gestion (g) |
|---|---|---|---|---|---|---|---|---|---|---|---|---|
| | Sugar | Citric acid | Vinegar | Powdery flesh of Japanese apricot | Lactobacillus bifidus (cells/100 g) | | | | | | | |
| 110 | 96.9 | 3 | | 0.1 | | Calf (3 weeks old) | 20 | 21 | B | 4 | 986 | 1756 |
| 111 | 96.8 | 3 | 0.1 | 0.1 | | Calf (3 weeks old) | 20 | 21 | B | 4 | 998 | 1768 |
| 112-A | 96.9 | 3 | 0.1 | | $2.5 \times 10^8/100$ g | Calf (3 weeks old) | 20 | 21 | B | 4 | 976 | 1750 |
| 112-B | 97 | | 3 | | $2.5 \times 10^8/100$ g | Calf (3 weeks old) | 20 | 21 | B | 4 | 970 | 1740 |
| 112-C | 97 | | | 3 | | Calf (3 weeks old) | 20 | 21 | B | 4 | 965 | 1743 |
| Comparative Example 43 | 97 | 3 | | | | Calf (3 weeks old) | 20 | 21 | B | 4 | 898 | 1698 |
| Example 113 | 40 | 25 | 15 | 20 | | Calf (3 weeks old) | 20 | 21 | B | 4 | 976 | 1763 |
| 114-A | 60 | 25 | 15 | | $2.5 \times 10^{10}/100$ g | Calf (3 weeks old) | 20 | 21 | B | 4 | 981 | 1745 |
| 114-B | 75 | | 25 | | | Calf (3 weeks old) | 20 | 21 | B | 4 | 970 | 1748 |
| 114-C | 75 | | 5 | 20 | $2.5 \times 10^{10}/100$ g | Calf (3 weeks old) | 20 | 21 | B | 4 | 972 | 1741 |
| Comparative Example 44 | 75 | 25 | | | | Calf (3 weeks old) | 20 | 21 | B | 4 | 887 | 1683 |

*Kind of Base Feed Stuff
**Proportion of the pharmaceutical composition added to Base Feed Stuff (wt. %)

EXAMPLES 115–157 AND COMPARATIVE EXAMPLES 45–63

Components shown in Table 3 below were mixed in accordance with weight proportions shown in Table 3 to prepare pharmaceutical compositions for animals of the present Examples 115–157 and Comparative Examples 45–63.

Each of the pharmaceutical composition for animals was added to Base Feed Stuff C shown below at a given weight proportion shown in Table 3 to prepare test feed stuffs. Each of the test feed stuff was fed to animals freely. The results are shown in Table 3 below.

| Composition of Base Feed Stuff C | |
|---|---|
| Corn | 400 weight parts |
| Milo | 230 weight parts |
| Soybean meal | 270 weight parts |
| Fish powder (65%) | 50 weight parts |
| Yellow grease | 25 weight parts |
| Calcium carbonate | 5 weight parts |
| Calcium orthophosphate | 12 weight parts |
| Salt | 1.5 weight parts |
| Premix vitamins & minerals | 6.5 weight parts |

TABLE 3-(i)

| | Mix proportions of each component in pharmaceutical composition for animals (wt. %) | | | | | Kind of animal | Number of animals | Feed periods (days) | K.B.F.S.* | P.F.B.** (wt. %) | P.G.A. (%) |
|---|---|---|---|---|---|---|---|---|---|---|---|
| | Sugar | Citric acid | Vinegar | Powdery flesh of Japanese apricot | Lactobacillus bifidus (cells/100 g) | | | | | | |
| Example 115 | 90 | 7.5 | 2.5 | | | Chicken (15 | 5200 | 45 | C | 1 | 99.6 |

TABLE 3-(i)-continued

| | Mix proportions of each component in pharmaceutical composition for animals (wt. %) | | | | | | | | | |
|---|---|---|---|---|---|---|---|---|---|---|
| | Sugar | Citric acid | Vinegar | Powdery flesh of Japanese apricot | *Lactobacillus bifidus* (cells/100 g) | Kind of animal | Number of animals | Feed periods (days) | K.B.F.S.* | P.F.B.** (wt. %) | P.G.A. (%) |
| 116 | 91.25 | 7.5 | | 1.25 | | Chicken (15 days old) | 5200 | 45 | C | 1 | 99.6 |
| 117 | 88.75 | 7.5 | 2.5 | 1.25 | | Chicken (15 days old) | 5200 | 45 | C | 1 | 99.5 |
| 118-A | 90 | 7.5 | 2.5 | | $2.5 \times 10^8$/100 g | Chicken (15 days old) | 5200 | 45 | C | 1 | 99.4 |
| 118-B | 92.5 | | 7.5 | | $2.5 \times 10^8$/100 g | Chicken (15 days old) | 5200 | 45 | C | 1 | 99.2 |
| 118-C | 92.5 | | | 7.5 | | Chicken (15 days old) | 5200 | 45 | C | 1 | 99.1 |
| Comparative Example 45 | 92.5 | 7.5 | | | | Chicken (15 days old) | 5200 | 45 | C | 1 | 95.3 |
| Example 119 | 96.9 | 3 | 0.1 | | | Chicken (15 days old) | 5200 | 45 | C | 1 | 98.7 |
| 120 | 96.9 | 3 | | 0.1 | | Chicken (15 days old) | 5200 | 45 | C | 1 | 98.8 |
| 121 | 96.8 | 3 | 0.1 | 0.1 | | Chicken (15 days old) | 5200 | 45 | C | 1 | 99.1 |
| 122-A | 96.9 | 3 | 0.1 | | $2.5 \times 10^8$/100 g | Chicken (15 days old) | 5200 | 45 | C | 1 | 98.9 |
| 122-B | 97 | | 3 | | | Chicken (15 days old) | 5200 | 45 | C | 1 | 98.7 |
| 122-C | 97 | | | 3 | $2.5 \times 10^8$/100 g | Chicken (15 days old) | 5200 | 45 | C | 1 | 98.8 |
| Comparative Example 46 | 97 | 3 | | | | Chicken (15 days old) | 5200 | 45 | C | 1 | 96.9 |
| Example 123 | 40 | 25 | 15 | 20 | | Chicken (15 days old) | 5200 | 45 | C | 1 | 98.9 |
| 124-A | 60 | 25 | 15 | | $2.5 \times 10^{10}$/100 g | Chicken (15 days old) | 5200 | 45 | C | 1 | 98.8 |
| 124-B | 75 | | 25 | | $2.5 \times 10^{10}$/100 g | Chicken (15 days old) | 5200 | 45 | C | 1 | 98.8 |
| 124-C | 75 | | 5 | 20 | | Chicken (15 days old) | 5200 | 45 | C | 1 | 98.8 |
| Comparative Example 47 | 75 | 25 | | | | Chicken (15 days old) | 5200 | 45 | C | 1 | 96.8 |
| Example 125 | 10 | 50 | 30 | 10 | | Chicken (15 days old) | 2200 | 45 | C | 1 | 98.9 |
| 126 | 10 | 50 | 15 | 25 | | Chicken (15 days old) | 2200 | 45 | C | 1 | 98.8 |
| 127-A | 88 | 1 | 1 | 10 | | Chicken (15 days old) | 2200 | 45 | C | 1 | 98.7 |
| 127-B | 99 | | 1 | | | Chicken (15 days old) | 2200 | 45 | C | 1 | 98.7 |
| 127-C | 99 | | | 1 | | Chicken (15 days old) | 2200 | 45 | C | 1 | 98.6 |
| Comparative Example 48 | 10 | 90 | | | | Chicken (15 days old) | 2200 | 45 | C | 1 | 96.7 |
| 49 | 50 | 50 | | | | Chicken (15 days old) | 2200 | 45 | C | 1 | 96.6 |
| 50 | 99 | 1 | | | | Chicken (15 days old) | 2200 | 45 | C | 1 | 96.9 |

*Kind of Base Feed Stuff
**Proportion of the pharmaceutical composition added to Base Feed Stuff (wt. %)

TABLE 3-(ii)

| | Mix proportions of each component in pharmaceutical composition for animals (wt. %) | | | | Kind of animal | Number of animals | Feed periods (days) | K.B.F.S.* | P.F.B.** (wt. %) | P.G.A. (%) |
|---|---|---|---|---|---|---|---|---|---|---|
| | Glucose | Lactic acid | Vinegar | rind of lemon | | | | | | |
| Example | | | | | | | | | | |
| 128 | 10 | 50 | 30 | 10 | Chicken (15 days old) | 2200 | 45 | C | 1 | 98.7 |
| 129 | 10 | 50 | 15 | 25 | Chicken (15 days old) | 2200 | 45 | C | 1 | 98.9 |
| 130 | 88 | 1 | 1 | 10 | Chicken (15 days old) | 2200 | 45 | C | 1 | 98.6 |
| 131 | 98.9 | 1 | | 0.1 | Chicken (15 days old) | 2200 | 45 | C | 1 | 98.8 |
| 132-A | 88.75 | 7.5 | 2.5 | 1.25 | Chicken (15 days old) | 2200 | 45 | C | 1 | 99.4 |
| 132-B | 99 | | | 1 | Chicken (15 days old) | 2200 | 45 | C | 1 | 98.7 |
| 132-C*[8] | 99 | | | | Chicken (15 days old) | 2200 | 45 | C | 1 | 98.6 |
| 132-D | 92.5 | | | | Chicken (15 days old) | 2200 | 45 | C | 1 | 98.7 |
| 132-E*[9] | 92.5 | | | | Chicken (15 days old) | 2200 | 45 | C | 1 | 98.8 |
| Comparative Example | | | | | | | | | | |
| 51 | 10 | 90 | | | Chicken (15 days old) | 2200 | 45 | C | 1 | 96.8 |
| 52 | 50 | 50 | | | Chicken (15 days old) | 2200 | 45 | C | 1 | 96.7 |
| 53 | 99 | 1 | | | Chicken (15 days old) | 2200 | 45 | C | 1 | 96.9 |
| 54 | 92.5 | 7.5 | | | Chicken (15 days old) | 2200 | 45 | C | 1 | 97.0 |

*Kind of Base Feed Stuff
**Proportion of the pharmaceutical composition added to Base Feed Stuff (wt. %)
*[8] In addition to 99 wt. % of glucose, 1 wt. % of powdery tomato is mixed.
*[9] In addition to 92.5 wt. % of glucose, 7.5 wt. % of powdery tomato is mixed.

TABLE 3-(iii)

| | Mix proportions of each component in pharmaceutical composition for animals (wt. %) | | | | Kind of animal | Number of animals | Feed periods (days) | K.B.F.S.* | P.F.B.** (wt %) | P.G.A. (%) |
|---|---|---|---|---|---|---|---|---|---|---|
| | Glucose | Fumaric acid | Vinegar | Powdery tomato | | | | | | |
| Example | | | | | | | | | | |
| 133 | 10 | 50 | 30 | 10 | Chicken (15 days old) | 2200 | 45 | C | 1 | 98.8 |
| 134 | 10 | 50 | 15 | 25 | Chicken (15 days old) | 2200 | 45 | C | 1 | 98.9 |
| 135 | 88 | 1 | 1 | 10 | Chicken (15 days old) | 2200 | 45 | C | 1 | 98.7 |
| 136 | 98.9 | 1 | | 0.1 | Chicken (15 days old) | 2200 | 45 | C | 1 | 98.8 |
| 137 | 88.75 | 7.5 | 2.5 | 1.25 | Chicken (15 days old) | 2200 | 45 | C | 1 | 99.3 |
| Comparative Example | | | | | | | | | | |
| 55 | 10 | 90 | | | Chicken (15 days old) | 2200 | 45 | C | 1 | 96.9 |
| 56 | 50 | 50 | | | Chicken (15 days old) | 2200 | 45 | C | 1 | 96.8 |
| 57 | 99 | 1 | | | Chicken (15 days old) | 2200 | 45 | C | 1 | 96.9 |

*Kind of Base Feed Stuff
**Proportion of the pharmaceutical composition added to Base Feed Stuff (wt. %)

TABLE 3-(iv)

| | Mix proportions of each component in pharmaceutical composition for animals (wt. %) | | | | | Kind of animal | Number of animals | Feed periods (days) | K.B.F.S.* | P.F.B.** (wt. %) | P.G.A. (%) |
|---|---|---|---|---|---|---|---|---|---|---|---|
| | Sugar | Citric acid | Vinegar | Powdery flesh of Japanese apricot | *Lactobacillus bifidus* (cells/100 g) | | | | | | |
| Example | | | | | | | | | | | |
| 138 | 90 | 7.5 | 2.5 | | | Quail (20 days old) | 500 | 40 | C | 1 | 98.4 |
| 139 | 91.25 | 7.5 | | 1.25 | | Quail (20 days old) | 500 | 40 | C | 1 | 98.6 |

TABLE 3-(iv)-continued

| | Mix proportions of each component in pharmaceutical composition for animals (wt. %) | | | | | Kind of animal | Number of animals | Feed periods (days) | K.B.F.S.* | P.F.B.** (wt. %) | P.G.A. (%) |
|---|---|---|---|---|---|---|---|---|---|---|---|
| | Sugar | Citric acid | Vinegar | Powdery flesh of Japanese apricot | *Lactobacillus bifidus* (cells/100 g) | | | | | | |
| 140 | 88.75 | 7.5 | 2.5 | 1.25 | | Quail (20 days old) | 500 | 40 | C | 1 | 98.8 |
| 141-A | 90 | 7.5 | 2.5 | | $2.5 \times 10^8/100$ g | Quail (20 days old) | 500 | 40 | C | 1 | 98.6 |
| 141-B | 92.5 | | 7.5 | | $2.5 \times 10^8/100$ g | Quail (20 days old) | 500 | 40 | C | 1 | 98.4 |
| 141-C | 92.5 | | | 7.5 | | Quail (20 days old) | 500 | 40 | C | 1 | 98.2 |
| Comparative Example 58 | 92.5 | 7.5 | | | | Quail (20 days old) | 500 | 40 | C | 1 | 93.8 |
| Example 142 | 96.9 | 3 | 0.1 | | | Quail (20 days old) | 500 | 40 | C | 1 | 97.4 |
| 143 | 96.9 | 3 | | 0.1 | | Quail (20 days old) | 500 | 40 | C | 1 | 97.6 |
| 144 | 96.8 | 3 | 0.1 | 0.1 | | Quail (20 days old) | 500 | 40 | C | 1 | 98.0 |
| 145-A | 96.9 | 3 | 0.1 | | $2.5 \times 10^8/100$ g | Quail (20 days old) | 500 | 40 | C | 1 | 97.6 |
| 145-B | 97 | | 3 | | | Quail (20 days old) | 500 | 40 | C | 1 | 97.2 |
| 145-C | 97 | | | 3 | $2.5 \times 10^8/100$ g | Quail (20 days old) | 500 | 40 | C | 1 | 97.4 |
| Comparative Example 59 | 97 | 3 | | | | Quail (20 days old) | 500 | 40 | C | 1 | 95.4 |
| Example 146 | 40 | 25 | 15 | 20 | | Quail (20 days old) | 500 | 40 | C | 1 | 97.4 |
| 147-A | 60 | 25 | 15 | | $2.5 \times 10^{10}/100$ g | Quail (20 days old) | 500 | 40 | C | 1 | 97.6 |
| 147-B | 75 | | 25 | | $2.5 \times 10^{10}/100$ g | Quail (20 days old) | 500 | 40 | C | 1 | 97.4 |
| 147-C | 75 | | 5 | 20 | | Quail (20 days old) | 500 | 40 | C | 1 | 97.2 |
| Comparative Example 60 | 75 | 25 | | | | Quail (20 days old) | 500 | 40 | C | 1 | 95.2 |
| Example 148 | 90 | 7.5 | 2.5 | | | Turkey (20 days old) | 500 | 40 | C | 1 | 98.8 |
| 149 | 91.25 | 7.5 | | 1.25 | | Turkey (20 days old) | 500 | 40 | C | 1 | 99.0 |
| 150 | 88.75 | 7.5 | 2.5 | 1.25 | | Turkey (20 days old) | 500 | 40 | C | 1 | 98.8 |
| 151-A | 90 | 7.5 | 2.5 | | $2.5 \times 10^8/100$ g | Turkey (20 days old) | 500 | 40 | C | 1 | 99.0 |
| 151-B | 92.5 | | 7.5 | | | Turkey (20 days old) | 500 | 40 | C | 1 | 98.6 |
| 151-C | 92.5 | | | 7.5 | $2.5 \times 10^8/100$ g | Turkey (20 days old) | 500 | 40 | C | 1 | 98.8 |
| Comparative Example 61 | 92.5 | 7.5 | | | | Turkey (20 days old) | 500 | 40 | C | 1 | 89.4 |
| Example 152 | 96.9 | 3 | 0.1 | | | Turkey | 500 | 40 | C | 1 | 97.4 |

TABLE 3-(iv)-continued

| | Mix proportions of each component in pharmaceutical composition for animals (wt. %) | | | | | Kind of animal | Number of animals | Feed periods (days) | K.B.F.S.* | P.F.B.** (wt. %) | P.G.A. (%) |
|---|---|---|---|---|---|---|---|---|---|---|---|
| | Sugar | Citric acid | Vinegar | Powdery flesh of Japanese apricot | Lactobacillus bifidus (cells/100 g) | | | | | | |
| 153 | 96.9 | 3 | | 0.1 | | Turkey (20 days old) | 500 | 40 | C | 1 | 97.6 |
| 154 | 96.8 | 3 | 0.1 | 0.1 | | Turkey (20 days old) | 500 | 40 | C | 1 | 97.4 |
| 155-A | 96.9 | 3 | 0.1 | | $2.5 \times 10^8/100$ g | Turkey (20 days old) | 500 | 40 | C | 1 | 97.6 |
| 155-B | 97 | | 3 | | $2.5 \times 10^8/100$ g | Turkey (20 days old) | 500 | 40 | C | 1 | 97.2 |
| 155-C | 97 | | | 3 | | Turkey (20 days old) | 500 | 40 | C | 1 | 97.0 |
| Comparative Example 62 | 97 | 3 | | | | Turkey (20 days old) | 500 | 40 | C | 1 | 90.6 |
| Example 156 | 40 | 25 | 15 | 20 | | Turkey (20 days old) | 500 | 40 | C | 1 | 97.8 |
| 157-A | 60 | 25 | 15 | | $2.5 \times 10^{10}/100$ g | Turkey (20 days old) | 500 | 40 | C | 1 | 98.0 |
| 157-B | 75 | 25 | | | | Turkey (20 days old) | 500 | 40 | C | 1 | 97.6 |
| 157-C | 75 | | 5 | 20 | $2.5 \times 10^{10}/100$ g | Turkey (20 days old) | 500 | 40 | C | 1 | 97.4 |
| Comparative Example 63 | 75 | 25 | | | | Turkey (20 days old) | 500 | 40 | C | 1 | 90.2 |

*Kind of Base Feed Stuff
**Proportion of the pharmaceutical composition added to Base Feed Stuff (wt. %)

EXAMPLES 158-220 AND COMPARATIVE EXAMPLES 64-82

Components shown in Table 4 below were mixed in accordance with weight proportions shown in Table 4 to prepare pharmaceutical compositions for animals of the present Examples 158-220 and Comparative Examples 64-82. 1 g of each of the pharmaceutical compositions for animals was added to 100 g of Base Feed Stuff D, E or F shown below to prepare test feed stuffs. Each of the test feed stuffs was fed to animals freely. "Growth %" is shown in Table 4 below.

| Composition of Base Feed Stuff D | |
|---|---|
| Fish powder | 69.4 weight parts |
| Beer yeast | 2.0 weight parts |
| α-Starch | 23.0 weight parts |
| Vitamins | 3.6 weight parts |
| Minerals | 2.0 weight parts |

| Composition of Base Feed Stuff E | |
|---|---|
| Fish powder | 65.0 weight parts |
| Cod-liver oil | 5.0 weight parts |
| Wheat flour | 17.4 weight parts |
| Vitamins | 4.0 weight parts |
| Minerals | 5.0 weight parts |
| Carboxy methylcellulose (CMC) | 5.0 weight parts |

| Composition of Base Feed Stuff F | |
|---|---|
| Fish powder | 74.4 weight parts |
| Corn starch | 6.0 weight parts |
| Cod-liver oil | 10.0 weight parts |
| Vitamins | 3.6 weight parts |
| Minerals | 1.0 weight parts |
| CMC | 5.0 weight parts |

TABLE 4-(i)

| | Mix proportions of each component in pharmaceutical composition for animals (wt. %) | | | | | Kind of fish | Number of fishes | Feed periods (days) | K.B.F.S.* | Feed per day (times) | P.G.A. |
|---|---|---|---|---|---|---|---|---|---|---|---|
| | Sugar | Citric acid | Vinegar | Powdery flesh of Japanese apricot | Lactobacillus bifidus (cells/100 g) | | | | | | |
| Example | | | | | | | | | | | |
| 158 | 90 | 7.5 | 2.5 | | | Eel (30 g/fish) | 500 | 70 | D | 1 | 97.6 |
| 159 | 91.25 | 7.5 | | 1.25 | | Eel (30 g/fish) | 500 | 70 | D | 1 | 97.8 |
| 160 | 88.75 | 7.5 | 2.5 | 1.25 | | Eel (30 g/fish) | 500 | 70 | D | 1 | 97.8 |
| 161-A | 90 | 7.5 | 2.5 | | $2.5 \times 10^8/100$ g | Eel (30 g/fish) | 500 | 70 | D | 1 | 97.8 |
| 161-B | 92.5 | | 7.5 | | $2.5 \times 10^8/100$ g | Eel (30 g/fish) | 500 | 70 | D | 1 | 97.4 |
| 161-C | 92.5 | | | 7.5 | | Eel (30 g/fish) | 500 | 70 | D | 1 | 97.6 |
| Comparative Example | | | | | | | | | | | |
| 64 | 92.5 | 7.5 | | | | Eel (30 g/fish) | 500 | 70 | D | 1 | 82.0 |
| Example | | | | | | | | | | | |
| 162 | 96.9 | 3 | 0.1 | | | Eel (30 g/fish) | 500 | 70 | D | 1 | 95.0 |
| 163 | 96.9 | 3 | | 0.1 | | Eel (30 g/fish) | 500 | 70 | D | 1 | 95.4 |
| 164 | 96.8 | 3 | 0.1 | 0.1 | | Eel (30 g/fish) | 500 | 70 | D | 1 | 95.4 |
| 165-A | 96.9 | 3 | 0.1 | | $2.5 \times 10^8/100$ g | Eel (30 g/fish) | 500 | 70 | D | 1 | 95.8 |
| 165-B | 97 | | 3 | | | Eel (30 g/fish) | 500 | 70 | D | 1 | 95.0 |
| 165-C | 97 | | | 3 | $2.5 \times 10^8/100$ g | Eel (30 g/fish) | 500 | 70 | D | 1 | 95.2 |
| Comparative Example | | | | | | | | | | | |
| 65 | 97 | 3 | | | | Eel (30 g/fish) | 500 | 70 | D | 1 | 83.6 |
| Example | | | | | | | | | | | |
| 166 | 40 | 25 | 15 | 20 | | Eel (30 g/fish) | 500 | 70 | D | 1 | 96.8 |
| 167-A | 60 | 25 | 15 | | $2.5 \times 10^{10}/100$ g | Eel (30 g/fish) | 500 | 70 | D | 1 | 96.8 |
| 167-B | 75 | | 25 | | $2.5 \times 10^{10}/100$ g | Eel (30 g/fish) | 500 | 70 | D | 1 | 96.2 |
| 167-C | 75 | | 5 | 20 | | Eel (30 g/fish) | 500 | 70 | D | 1 | 96.4 |
| Comparative Example | | | | | | | | | | | |
| 66 | 75 | 25 | | | | Eel (30 g/fish) | 500 | 70 | D | 1 | 83.2 |
| Example | | | | | | | | | | | |
| 168 | 10 | 50 | 30 | 10 | | Eel (30 g/fish) | 500 | 70 | D | 1 | 94.0 |
| 169 | 10 | 50 | 15 | 25 | | Eel (30 g/fish) | 500 | 70 | D | 1 | 93.6 |
| 170-A | 88 | 1 | 1 | 10 | | Eel (30 g/fish) | 500 | 70 | D | 1 | 93.8 |
| 170-B | 99 | | 1 | | | Eel (30 g/fish) | 500 | 70 | D | 1 | 93.0 |
| 170-C | 99 | | | 1 | | Eel (30 g/fish) | 500 | 70 | D | 1 | 93.2 |
| Comparative Example | | | | | | | | | | | |
| 67 | 10 | 90 | | | | Eel (30 g/fish) | 500 | 70 | D | 1 | 88.6 |
| 68 | 50 | 50 | | | | Eel (30 g/fish) | 500 | 70 | D | 1 | 87.8 |
| 69 | 99 | 1 | | | | Eel (30 g/fish) | 500 | 70 | D | 1 | 88.4 |

*Kind of Base Feed Stuff

TABLE 4-(ii)

| | Mix proportions of each component in pharmaceutical composition for animals (wt. %) | | | | Kind of fish | Number of fishes | Feed periods (days) | K.B.F.S.* | Feed per day (times) | P.G.A. (%) |
|---|---|---|---|---|---|---|---|---|---|---|
| | Glucose | Lactic acid | Vinegar | Powdery rind of lemon | | | | | | |
| Example | | | | | | | | | | |
| 171 | 10 | 50 | 30 | 10 | Eel (30 g/fish) | 500 | 70 | D | 1 | 94.2 |
| 172 | 10 | 50 | 15 | 25 | Eel (30 g/fish) | 500 | 70 | D | 1 | 96.2 |
| 173 | 88 | 1 | 1 | 10 | Eel (30 g/fish) | 500 | 70 | D | 1 | 95.6 |
| 174 | 98.9 | 1 | | 0.1 | Eel (30 g/fish) | 500 | 70 | D | 1 | 93.8 |
| 175-A | 88.75 | 7.5 | 2.5 | 1.25 | Eel (30 g/fish) | 500 | 70 | D | 1 | 97.6 |
| 175-B | 99 | | | 1 | Eel (30 g/fish) | 500 | 70 | D | 1 | 93.8 |
| 175-C*[10] | 99 | | | | Eel (30 g/fish) | 500 | 70 | D | 1 | 93.6 |
| 175-D | 92.5 | | | 7.5 | Eel (30 g/fish) | 500 | 70 | D | 1 | 94.2 |
| 175-E*[11] | 92.5 | | | | Eel (30 g/fish) | 500 | 70 | D | 1 | 94.0 |
| Comparative Example | | | | | | | | | | |
| 70 | 10 | 90 | | | Eel (30 g/fish) | 500 | 70 | D | 1 | 88.6 |
| 71 | 50 | 50 | | | Eel (30 g/fish) | 500 | 70 | D | 1 | 88.0 |
| 72 | 99 | 1 | | | Eel (30 g/fish) | 500 | 70 | D | 1 | 87.0 |
| 73 | 92.5 | 7.5 | | | Eel (30 g/fish) | 500 | 70 | D | 1 | 88.4 |

*Kind of Base Feed Stuff
*[10] In addition to 99 wt. % of glucose, 1 wt. % of powdery tomato is mixed.
*[11] In addition to 92.5 wt. % of glucose, 7.5 wt. % of powdery tomato is mixed.

TABLE 4-(iii)

| | Mix proportions of each component in pharmaceutical composition for animals (wt. %) | | | | Kind of fish | Number of fishes | Feed periods (days) | K.B.F.S.* | Feed per day (times) | P.G.A. (%) |
|---|---|---|---|---|---|---|---|---|---|---|
| | Glucose | Fumaric acid | Vinegar | Powdery tomato | | | | | | |
| Example | | | | | | | | | | |
| 176 | 10 | 50 | 30 | 10 | Eel (30 g/fish) | 500 | 70 | D | 1 | 94.4 |
| 177 | 10 | 50 | 15 | 25 | Eel (30 g/fish) | 500 | 70 | D | 1 | 93.8 |
| 178 | 88 | 1 | 1 | 10 | Eel (30 g/fish) | 500 | 70 | D | 1 | 94.2 |
| 179 | 98.9 | 1 | | 0.1 | Eel (30 g/fish) | 500 | 70 | D | 1 | 94.0 |
| 180 | 88.75 | 7.5 | 2.5 | 1.25 | Eel (30 g/fish) | 500 | 70 | D | 1 | 96.8 |
| Comparative Example | | | | | | | | | | |
| 74 | 10 | 90 | | | Eel (30 g/fish) | 500 | 70 | D | 1 | 87.4 |
| 75 | 50 | 50 | | | Eel (30 g/fish) | 500 | 70 | D | 1 | 88.8 |
| 76 | 99 | 1 | | | Eel (30 g/fish) | 500 | 70 | D | 1 | 86.2 |

*Kind of Base Feed Stuff

TABLE 4-(iv)

| | Mix proportions of each component in pharmaceutical composition for animals (wt. %) | | | | | Kind of fish | Number of fishes | Feed periods (days) | K.B.F.S.* | Feed per day (times) | P.G.A. |
|---|---|---|---|---|---|---|---|---|---|---|---|
| | Sugar | Citric acid | Vinegar | Powdery flesh of Japanese apricot | Lactobiacillus bifidus (cells/100 g) | | | | | | |
| Example | | | | | | | | | | | |
| 181 | 90 | 7.5 | 2.5 | | | Horse mackerel (40 g/fish) | 200 | 140 | E | 4 | 97.0 |
| 182 | 91.25 | 7.5 | | 1.25 | | Horse mackerel (40 g/fish) | 200 | 140 | E | 4 | 97.0 |

TABLE 4-(iv)-continued

| | Mix proportions of each component in pharmaceutical composition for animals (wt. %) | | | | Kind of fish | Number of fishes | Feed periods (days) | K.B.F.S.* | Feed per day (times) | P.G.A. |
|---|---|---|---|---|---|---|---|---|---|---|
| | Sugar | Citric acid | Vinegar | Powdery flesh of Japanese apricot | *Lactobiacillus bifidus* (cells/100 g) | | | | | |
| 183 | 88.75 | 7.5 | 2.5 | 1.25 | | Horse mackerel (40 g/fish) | 200 | 140 | E | 4 | 98.5 |
| 184-A | 90 | 7.5 | 2.5 | | $2.5 \times 10^8$/100 g | Horse mackerel (40 g/fish) | 200 | 140 | E | 4 | 97.0 |
| 184-B | 92.5 | 7.5 | | | $2.5 \times 10^8$/100 g | Horse mackerel (40 g/fish) | 200 | 140 | E | 4 | 96.5 |
| 184-C | 92.5 | | | 7.5 | | Horse mackerel (40 g/fish) | 200 | 140 | E | 4 | 96.0 |
| Comparative Example 77 | 92.5 | 7.5 | | | | Horse mackerel (40 g/fish) | 200 | 140 | E | 4 | 78.5 |
| Example 185 | 96.9 | 3 | 0.1 | | | Horse mackerel (40 g/fish) | 200 | 140 | E | 4 | 93.5 |
| 186 | 96.9 | 3 | | 0.1 | | Horse mackerel (40 g/fish) | 200 | 140 | E | 4 | 93.5 |
| 187 | 96.8 | 3 | 0.1 | 0.1 | | Horse mackerel (40 g/fish) | 200 | 140 | E | 4 | 94.0 |
| 188-A | 96.9 | 3 | 0.1 | | $2.5 \times 10^8$/100 g | Horse mackerel (40 g/fish) | 200 | 140 | E | 4 | 94.0 |
| 188-B | 97 | | 3 | | | Horse mackerel (40 g/fish) | 200 | 140 | E | 4 | 93.0 |
| 188-C | 97 | | | 3 | $2.5 \times 10^8$/100 g | Horse mackerel (40 g/fish) | 200 | 140 | E | 4 | 92.5 |
| Comparative Example 78 | 97 | 3 | | | | Horse mackerel (40 g/fish) | 200 | 140 | E | 4 | 81.5 |
| Example 189 | 40 | 25 | 15 | 20 | | Horse mackerel (40 g/fish) | 200 | 140 | E | 4 | 96.5 |
| 190-A | 60 | 25 | 15 | | | Horse mackerel (40 g/fish) | 200 | 140 | E | 4 | 96.0 |
| 190-B | 75 | | 25 | | $2.5 \times 10^{10}$/100 g | Horse mackerel (40 g/fish) | 200 | 140 | E | 4 | 95.5 |
| 190-C | 75 | | 5 | 20 | | Horse mackerel (40 g/fish) | 200 | 140 | E | 4 | 95.0 |
| Comparative Example 79 | 75 | 25 | | | | Horse mackerel (40 g/fish) | 200 | 140 | E | 4 | 80.0 |
| Example 191 | 90 | 7.5 | 2.5 | | | Yellowtail (20 g/fish) | 200 | 350 | F | 4 | 97.5 |
| 192 | 91.25 | 7.5 | | 1.25 | | Yellowtail (20 g/fish) | 200 | 350 | F | 4 | 97.0 |
| 193 | 88.75 | 7.5 | 2.5 | 1.25 | | Yellowtail (20 g/fish) | 200 | 350 | F | 4 | 97.5 |
| 194-A | 90 | 7.5 | 2.5 | | $2.5 \times 10^8$/100 g | Yellowtail (20 g/fish) | 200 | 350 | F | 4 | 97.0 |
| 194-B | 92.5 | 7.5 | | | | Yellowtail (20 g/fish) | 200 | 350 | F | 4 | 96.0 |
| 194-C | 92.5 | | | 7.5 | $2.5 \times 10^8$/100 g | Yellowtail (20 g/fish) | 200 | 350 | F | 4 | 96.5 |
| Comparative Example 80 | 92.5 | 7.5 | | | | Yellowtail (20 g/fish) | 200 | 350 | F | 4 | 85.0 |
| Example 195 | 96.9 | 3 | 0.1 | | | Yellowtail (20 g/fish) | 200 | 350 | F | 4 | 95.0 |
| 196 | 96.9 | 3 | | 0.1 | | Yellowtail (20 g/fish) | 200 | 350 | F | 4 | 94.5 |
| 197 | 96.8 | 3 | 0.1 | 0.1 | | Yellowtail (20 g/fish) | 200 | 350 | F | 4 | 95.0 |
| 198-A | 96.9 | 3 | 0.1 | | $2.5 \times 10^8$/100 g | Yellowtail (20 g/fish) | 200 | 350 | F | 4 | 95.0 |

TABLE 4-(iv)-continued

| | Mix proportions of each component in pharmaceutical composition for animals (wt. %) | | | | | Kind of fish | Number of fishes | Feed periods (days) | K.B.F.S.* | Feed per day (times) | P.G.A. |
|---|---|---|---|---|---|---|---|---|---|---|---|
| | Sugar | Citric acid | Vinegar | Powdery flesh of Japanese apricot | Lactobiacillus bifidus (cells/100 g) | | | | | | |
| 198-B | 97 | | 3 | | $2.5 \times 10^8/100$ g | Yellowtail (20 g/fish) | 200 | 350 | F | 4 | 93.5 |
| 198-C | 97 | | | 3 | | Yellowtail (20 g/fish) | 200 | 350 | F | 4 | 94.0 |
| Comparative Example | | | | | | | | | | | |
| 81 | 97 | 3 | | | | Yellowtail (20 g/fish) | 200 | 350 | F | 4 | 87.0 |
| Example | | | | | | | | | | | |
| 199 | 40 | 25 | 15 | 20 | | Yellowtail (20 g/fish) | 200 | 350 | F | 4 | 97.0 |
| 200-A | 60 | 25 | 15 | | $2.5 \times 10^{10}/100$ g | Yellowtail (20 g/fish) | 200 | 350 | F | 4 | 96.0 |
| 200-B | 75 | | 25 | | | Yellowtail (20 g/fish) | 200 | 350 | F | 4 | 96.0 |
| 200-C | 75 | | 5 | 20 | $2.5 \times 10^{10}/100$ g | Yellowtail (20 g/fish) | 200 | 350 | F | 4 | 95.5 |
| Comparative Example | | | | | | | | | | | |
| 82 | 75 | 25 | | | | Yellowtail (20 g/fish) | 200 | 350 | F | 4 | 86.5 |

*Kind of Base Feed Stuff

EXAMPLES 201-210 AND COMPARATIVE EXAMPLES 83-85

Components shown in Table 5 below were mixed in accordance with weight proportions shown in Table 5 to prepare pharmaceutical compositions for animals of the present Examples 201-210 and Comparative Examples 83-85. 0.5 g of each of the pharmaceutical compositions were added to 100 g of Base Feed Stuff G shown below to prepare test feed stuffs. Each of the test feed stuffs was fed freely to milk cows of one month old for 60 days. The amount of milk obtained was determined every day and the mean milk fat was determined every ten days. The results are shown in Table 5 below.

| Composition of Base Feed Stuff G | |
|---|---|
| Corn | 40.0 weight parts |
| Milo | 13.5 weight parts |
| Wheat flour | 18.0 weight parts |
| Barley | 6.5 weight parts |
| Wheat bran | 9.0 weight parts |
| Soybean oil meal | 7.0 weight parts |
| Molasses | 2.7 weight parts |
| Calcium carbonate | 1.5 weight parts |
| Calcium phosphate | 1.1 weight parts |
| Salt | 0.5 weight parts |
| Vitamins | 0.1 weight parts |
| Minerals | 0.1 weight parts |

TABLE 5

| | Mix proportions of each component in pharmaceutical composition for animals (wt. %) | | | | | Amount of milk/day. cow (kg) | M.M.F. (%) |
|---|---|---|---|---|---|---|---|
| | Sugar | Citric acid | Vinegar | Powdery flesh of Japanese apricot | Lactobacillus bifidus (cells/100 g) | | |
| Example | | | | | | | |
| 201 | 90 | 7.5 | 2.5 | | | 23.3 | 3.8 |
| 202 | 91.25 | 7.5 | | 1.25 | | 23.6 | 3.8 |
| 203 | 88.75 | 7.5 | 2.5 | 1.25 | | 24.6 | 3.8 |
| 204-A | 90 | 7.5 | 2.5 | | $2.5 \times 10^8/100$ g | 24.0 | 3.8 |
| 204-B | 92.5 | | 7.5 | | | 23.0 | 3.8 |
| 204-C | 92.5 | | | 7.5 | | 22.9 | 3.8 |
| Comparative Example | | | | | | | |
| 83 | 92.5 | 7.5 | | | | 17.9 | 3.4 |
| Example | | | | | | | |
| 205 | 96.9 | 3 | 0.1 | | | 22.0 | 3.7 |
| 206 | 96.9 | 3 | | 0.1 | | 22.4 | 3.8 |
| 207 | 96.8 | 3 | 0.1 | 0.1 | | 23.3 | 3.7 |
| 208-A | 96.9 | 3 | 0.1 | | $2.5 \times 10^8/100$ g | 23.0 | 3.7 |
| 208-B | 97 | | 3 | | | 21.8 | 3.7 |
| 208-C | 97 | | | 3 | | 21.5 | 3.7 |
| Comparative Example | | | | | | | |
| 84 | 97 | 3 | | | | 18.2 | 3.4 |
| Example | | | | | | | |

TABLE 5-continued

| | Mix proportions of each component in pharmaceutical composition for animals (wt. %) | | | | | | |
|---|---|---|---|---|---|---|---|
| | Sugar | Citric acid | Vinegar | Powdery flesh of Japanese apricot | Lactobacillus bifidus (cells/100 g) | Amount of milk/ day. cow (kg) | M.M.F. (%) |
| 209 | 40 | 25 | 15 | 20 | | 21.8 | 3.7 |
| 210-A | 60 | 25 | 15 | | $2.5 \times 10^{10}/100$ g | 22.3 | 3.7 |
| 210-B | 75 | | 25 | | | 21.0 | 3.7 |
| 210-C | 75 | | 5 | 20 | | 22.0 | 3.7 |
| Comparative Example | | | | | | | |
| 85 | 75 | 25 | | | | 18.4 | 3.4 |

EXAMPLE 211

88.75 weight parts of sugar, 7.5 weight parts of citric acid, 2.5 weight parts of vinegar and 1.25 weight parts of powdery flesh of Japanese apricot were mixed to prepare a pharmaceutical composition for broilers. 0.7 g of the pharmaceutical composition was added to 100 g of Base Feed Stuff H shown below, and the mixture was then fed freely to 2500 heads of broilers from 15 to 8 days before their forwarding.

Then, 1.28 g of said pharmaceutical composition was added to 100 g of said Base Feed Stuff H, and fed freely to said 2500 heads of broilers during 7 days before their forwarding.

| Composition of Base Feed Stuff H | |
|---|---|
| Corn | 450 weight parts |
| Milo | 260 weight parts |
| Soybean meal | 190 weight parts |
| Fish powder | 50 weight parts |
| Yellow grease | 30 weight parts |
| Calcium carbonate | 7 weight parts |
| Calcium triphosphate | 6 weight parts |
| Salt | |
| Premix vitamins & minerals | 5 weight parts |

Said broilers were butchered and the quality of their bodies and meats was observed, and the yield of meats was determined. On the other hand, said Base Feed Stuff H not containing the pharmaceutical composition of the present invention was feed to other 2500 broilers in the same manner as above. These broilers were butchered, and the quality of their bodies and meats was also observed and the yield was determined.

The results are as follows:

Bodies of butchered broilers bred with the pharmaceutical composition of the present invention (called hereinafter "present broilers") had better skin color and had tighter bodies than those of the comparative broilers.

The yield of butchered broilers' bodies of the present broilers was 1.5% larger than that of the comparative broilers.

. The thigh and breast of the present broilers had a beautiful pinkish color and were less fatty and were more resilient than those of the comparative broilers. The stomachs of the present broilers were less fatty.

The total weight of the fatty livers of the present 1200 broilers was 1.6 kg, and this was one third of that of 1200 comparative broilers. The yield of dissectioned bodies, which were dissectioned according to IV type-dissection of Japanese Agriculture Standard, was 40.0% in case of the present broilers. On the other hand, in case of the comparative broilers, that was 37.6%.

Breasts of the broilers were frozen in the temperature range of $-3°$ C. to $-8°$ C. for 81 hours, and then were thawed. Breasts of the present broilers were not hard. On the other hand, those of the comparative broilers were hard. Then, these thawed breasts were maintained at 16° C. for 20 minutes. The breasts of the present broilers had less drips than those of the comparative broilers.

EXAMPLE 212

In this example, the pharmaceutical composition for broilers prepared in the above Example 211 was used for beef cattles.

The pharmaceutical composition was fed to beef cattles of 490 days old 36 g per beef cattle per day together with the Base Feed Stuff I shown below.

| Base Feed Stuff I | |
|---|---|
| Corn | 40.0 weight parts |
| Milo | 13.5 weight parts |
| Wheat flour | 18.0 weight parts |
| Barley | 6.5 weight parts |
| Wheat bran | 9.0 weight parts |
| Soybean oil meal | 7.0 weight parts |
| Molasses | 2.7 weight parts |
| Calcium carbonate | 1.5 weight parts |
| Calcium phosphate | 1.1 weight parts |
| Salt | 0.5 weight parts |
| Vitamins | 0.1 weight parts |
| Minerals | 0.1 weight parts |

The beef cattles were butchered and dissectioned, and then the quality of the beef was observed. The beef of the present beef cattles had clearer red color than the comparative beef cattles. In the beef of the present beef cattles, fats were contained in dense and marble-like states.

What we claim is:

1. A process for preventing diarrhea in animals, which comprises:
    administering to an animal an anti-diarrheal effective amount of a veterinary composition comprising:
    (A) from about 0.1–50%, by weight, of at least one material selected form the group consisting of a vinegar, selected from the group consisting of rice vinegar, malt vinegar, alcohol vinegar, cider vinegar and wine vinegar, a dried powder of the flesh of Japanese apricot excluding its kernel, a dried powder of oranges, a dried powder of tomatoes and a dried powder of strawberries, and
    (B) from about 99.9–50%, by weight, of
        (i) saccharides alone or a combination of saccharides and an edible organic acid selected form the group consisting of citric acid, fumaric acid, formic acid, succinic acid, tartaric acid, and lactic acid.

2. The process of claim 1 wherein (A) in the veterinary composition is a mixture of a vinegar and the dried powder of the flesh of Japanese apricot.

3. The process of claim 1 wherein (A) in the veterinary composition is a vinegar.

4. The process of claim 1 wherein (A) is the dried powder of the flesh of Japanese apricot.

5. The process of claim 1 wherein (B) in the veterinary composition are saccharides.

6. The process of claim 1 wherein (B) in the veterinary composition is the combination of saccharides and an edible organic acid.

7. The process of claim 1 wherein the edible organic acid in the veterinary composition is at least one selected from the group consisting of citric acid, malic acid, fumaric acid, formic acid, succinic acid, tartaric acid and lactic acid.

8. The process of claim 1 wherein (A) in the veterinary composition is about 0.1-50 wt. % and (B) in the veterinary composition is about 99.9-50 wt. %.

9. The process of claim 1 wherein the veterinary composition comprises 1-25% of a vinegar, 1-20% of the dried powder of the flesh of Japanese apricot, 15-95.5% of saccharide and 2.5-40% of the edible organic acid based on the total weight of the composition.

10. The process of claim 1 wherein the veterinary composition comprises 1-25% of a vinegar and 75-99% of saccharides based on the total weight of the composition.

11. The process of cliam 1 wherein the veterinary composition comprises 1-20% of the dried powder of the flesh of the Japanese apricot and 80-99% of the saccharides based on the total weight of the composition.

12. The process of claim 1 wherein the veterinary composition comprises 1-25% of a vinegar, 1-20% of the dried powder of the flesh of the Japanese apricot and 55-98% of saccharides based on the total weight of the composition.

13. A process for preventing diarrhea in animals, which comprises:
administering to an animal an anti-diarrheal effective amount of a veterinary composition comprising:
(A) from about 0.1-50%, by weight, of at least one material selected form the group consisting of a vinegar, selected from the group consisting of rice vinegar, malt vinegar, alcohol vinegar, cider vinegar and wine vinegar, a dried powder of the flesh of Japanese apricot excluding its kernel, a dried powder of oranges, a dried powder of tomatoes and a dried powder of strawberries, and
(B) from about 99.9-50%, by weight, of saccharides alone or in combination with an edible organic acid selected from the group consisting of citric acid, fumaric acid, formic acid, succinic acid, tartaric acid and lactic acid, in combination with a base feedstuff.

* * * * *

UNITED STATES PATENT AND TRADEMARK OFFICE
CERTIFICATE OF CORRECTION

PATENT NO. : 5,171,575
DATED : December 15, 1992
INVENTOR(S) : Shibata et al.

It is certified that error appears in the above-identified patent and that said Letters Patent is hereby corrected as shown below:

Column 42, line 58, delete "form", insert -- from --.

Column 42, line 68, delete "form", insert -- from --.

Column 44, line 3, delete "cliam", insert -- claim --.

Column 44, line 18, delete "form", insert -- from --.

Signed and Sealed this

Eleventh Day of January, 1994

Attest:

BRUCE LEHMAN

Attesting Officer    Commissioner of Patents and Trademarks